United States Patent [19]

Trepl, II

[11] 4,379,235

[45] Apr. 5, 1983

[54] WAVE ACTION GENERATOR

[76] Inventor: John A. Trepl, II, 1691 Mesa Dr., Apt. F-13, Santa Ana, Calif. 92707

[21] Appl. No.: 241,659

[22] Filed: Mar. 9, 1981

[51] Int. Cl.³ .............................................. F03B 13/12
[52] U.S. Cl. ....................................... 290/53; 60/498; 60/502
[58] Field of Search .................................. 290/42, 53; 417/330–333, 337, 100; 60/495, 497–500, 502, 504–507

[56] References Cited

U.S. PATENT DOCUMENTS

| | | | |
|---|---|---|---|
| 428,283 | 5/1890 | Naramore | 417/333 |
| 657,943 | 9/1900 | Kimball | 60/505 |
| 918,870 | 4/1909 | Lawrence | 60/499 |
| 1,746,613 | 2/1930 | Shuler | 60/499 |
| 1,864,499 | 6/1932 | Grigsby | 290/42 |
| 1,923,887 | 8/1933 | Renda | 417/331 |
| 3,898,471 | 8/1975 | Schera, Jr. | 290/42 |
| 3,965,365 | 6/1976 | Parr | 290/42 |
| 4,260,901 | 4/1981 | Woodbridge | 290/42 |

Primary Examiner—J. V. Truhe
Assistant Examiner—Shelley Wade
Attorney, Agent, or Firm—Weissenberger and Peterson

[57] ABSTRACT

A wave motion motor is disclosed with an impeller moved by a float. The float is coupled to a swivel arrangement to turn in the direction of wave current and has an inclined underside. Also disclosed are means to adjust to tide level and triangular coupling means between the float and a flywheel.

16 Claims, 12 Drawing Figures

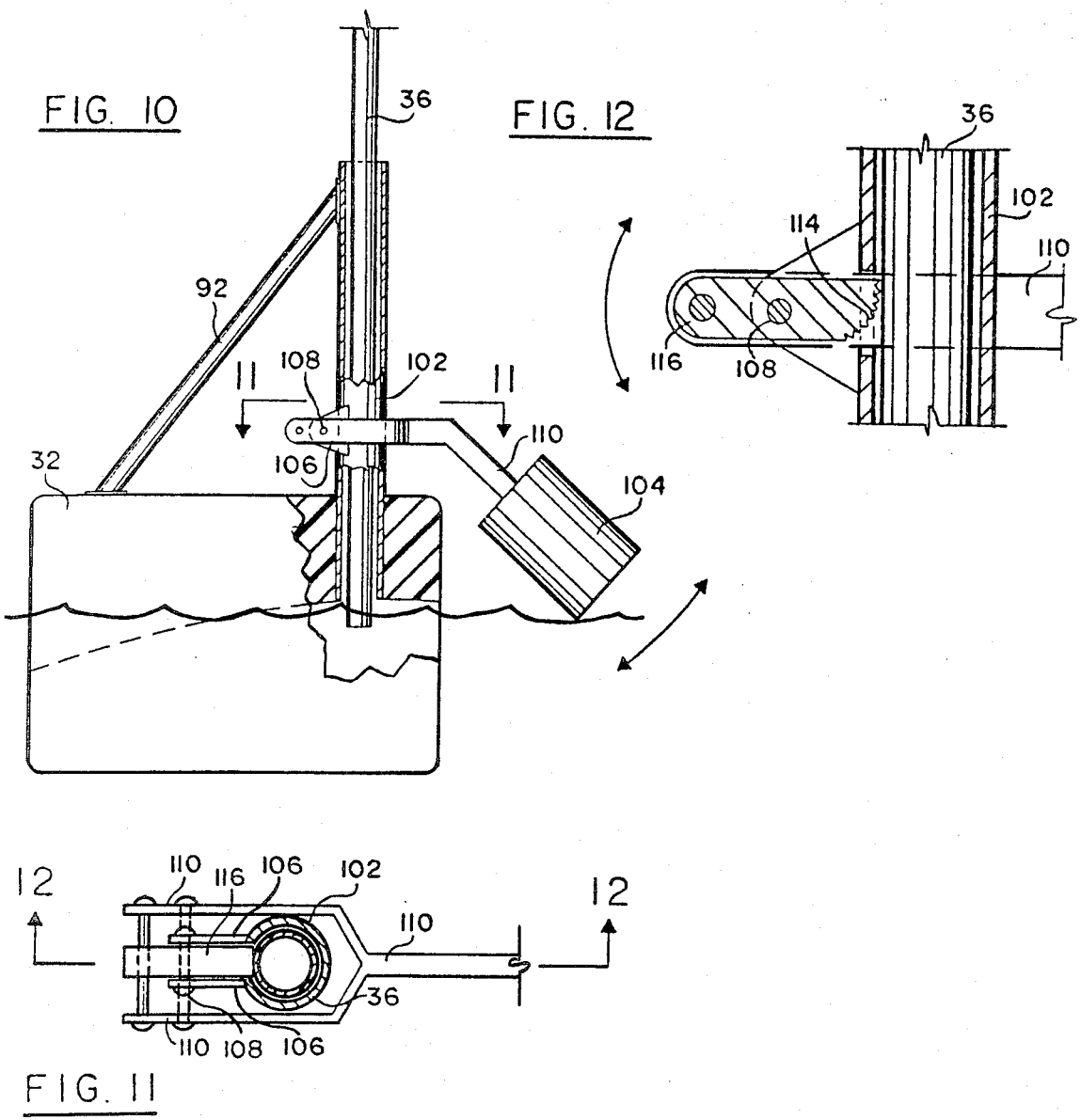

WAVE ACTION GENERATOR

BACKGROUND OF THE INVENTION

This invention relates to the generation of electrical power from the motion of sea water resulting from wave action.

Prior efforts to harness the power of sea water motion have usually involved complex schemes relying mostly on tidal action or on some complex utilization scheme of the wave motion at a given tide level. In remote coastal areas where power need be generated only on a relatively small scale, the previously proposed schemes are impractical due to their cost. A need therefore exists for a simple, reliable device which would be capable of economically providing electricity from the wave action of sea water for both large and small applications.

SUMMARY OF THE INVENTION

The present invention provides a simple and reliable means of deriving electrical power from the wave action of the sea. It basically envisions a pinion or sprocket driven through an appropriate impeller member by a float riding on the waves. The pinion or sprocket drives a flywheel through a one-way clutch arrangement. The flywheel in turn drives a generator for the production of electricity.

In order to make the device of this invention capable of utilizing the full wave motion at any tide height, it may, if desired, be equipped with a mechanism which automatically adjusts the device whenever the float-operated impeller member reaches the end of its travel capability as a result of the rising or falling of the tide.

In accordance with a further aspect of the invention, the float is so configured as to derive lifting power not only from the up-and-down motion of the waves themselves, but also from the horizontal motion of any currents which may exist from time to time at the location where the device is placed.

BRIEF DESCRIPTION OF THE DRAWINGS

FIG. 10 is a fragmentary side elevation, partly in section, showing an alternative tidal height variation mechanism particularly suitable for use with the embodiment of FIG. 5.

FIG. 11 is a horizontal section along line 11—11 of FIG. 10; and

FIG. 12 is an enlarged vertical detail section along line 12—12 of FIG. 11.

DETAILED DESCRIPTION OF THE DRAWINGS

Figure 1:
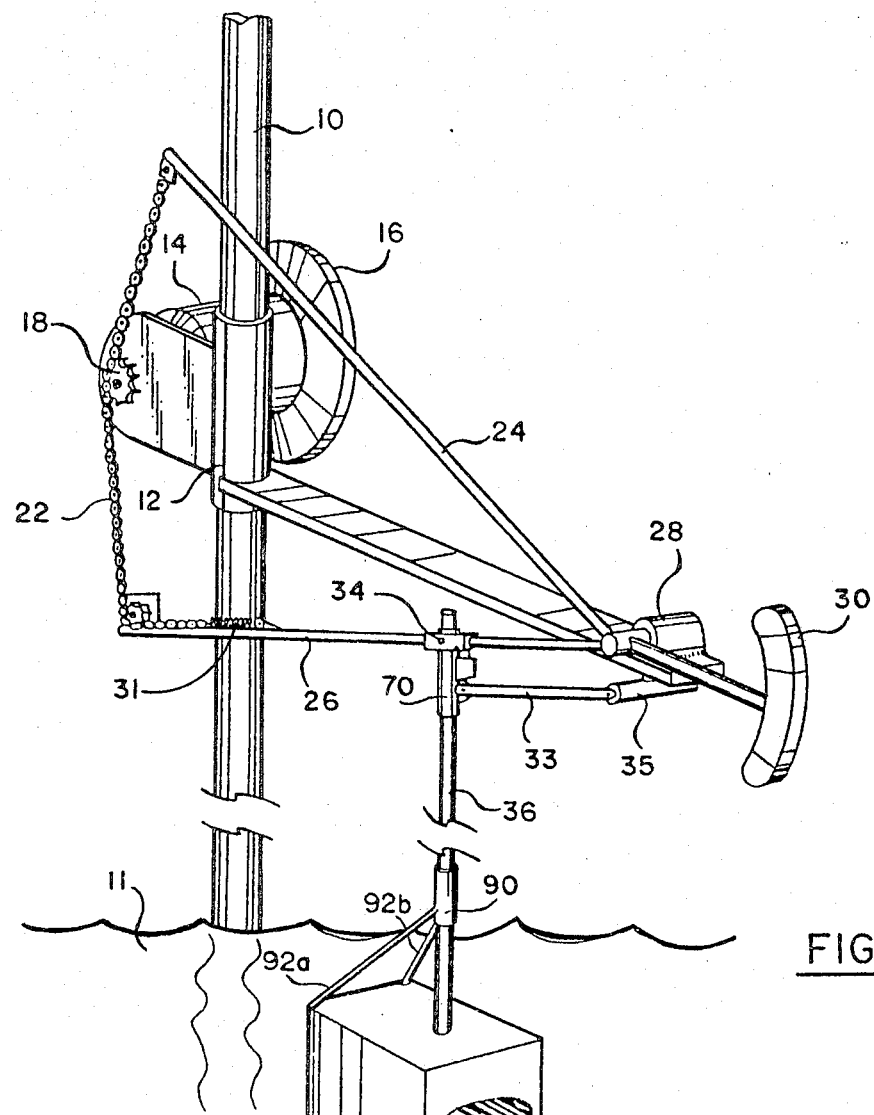
FIG. 1 is a perspective view showing a preferred embodiment of the invention in its natural environment.

FIG. 1 shows a typical preferred embodiment of the invention. A support such as a pole or mast 10 is positioned in an appropriate location in a body of water 11 whose wave motion is to be utilized. A mounting bracket 12 attached to the mast 10 supports a generator 14 equipped with a flywheel 16. The flywheel 16 is driven by sprocket 18 through a conventional one-way clutch (not shown). The one-way clutch is preferably so arranged as to cause the mechanism to drive the flywheel 16 on the upward motion of the chain 22, and to be disengaged from the flywheel 16 and generator 14 during the downward movement of the chain 22. Alternatively, conventional transmission means (not shown) may be provided in lieu of the one-way clutch to drive the flywheel 16 through appropriate oppositely ratcheted gearing arrangements in the same direction during both the upward and downward movement of chain 22.

The chain 22 extends between the outer ends of a pair of rigidly connected arms 24, 26 mounted for pivotal motion in pivot bearing 28 attached to the bracket 12. A counterweight 30 is preferably provided to balance the arms 24, 26 with respect to the bearing pivot 28. A tension spring 31 may be provided to hold the chain 22 taut against the pinion gear 18.

A float 32 whose specific construction will be discussed hereinbelow is pivotably mounted at 34 to arm 26. A link 33 cooperates with the shaft 36 of float 32, the arm 26, and a bracket 35 to form a pantograph arrangement which keeps the float shaft 36 vertical at all times.

Figure 2:
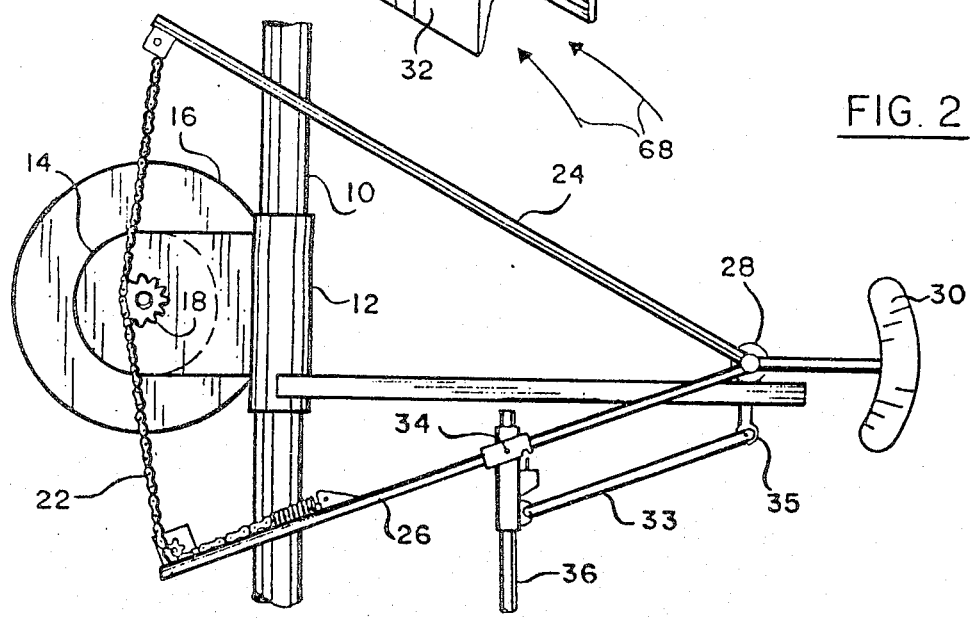
FIG. 2 is a side elevation of the principal mechanism of the embodiment of FIG. 1.
Figure 3:
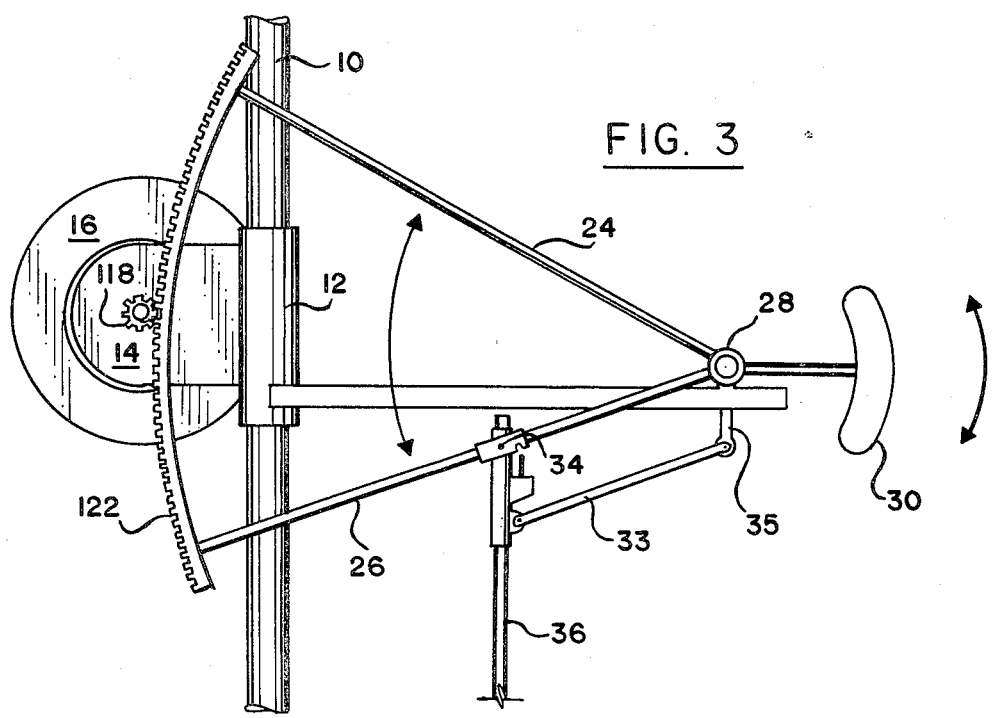
FIG. 3 is a side elevation of the mechanism of an alternative embodiment of the invention.
Figure 4:
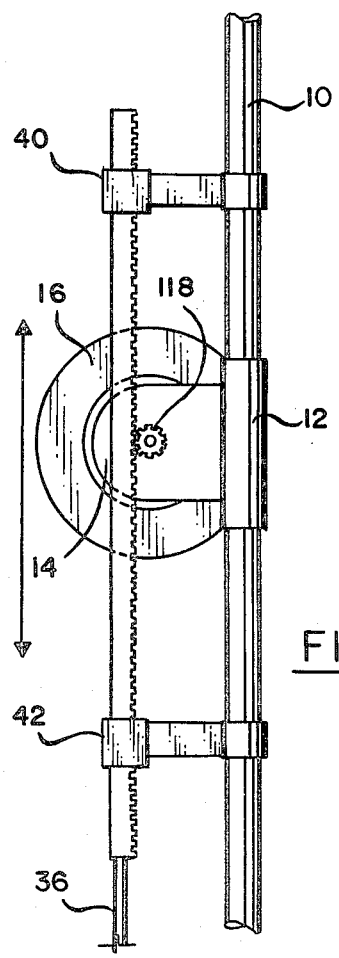
FIG. 4 is a side elevation of another alternative embodiment of the invention.
Figure 5:
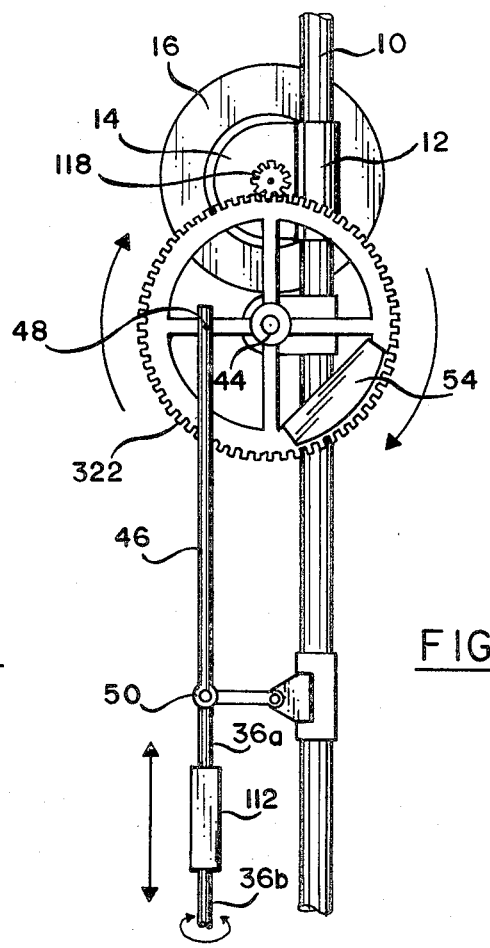
FIG. 5 is a side elevation of still another alternative embodiment of the invention.

FIGS. 3 through 5 show alternative mechanisms for impelling a pinion gear 118, which has the same function as the sprocket 18 of FIGS. 1 and 2 in driving the flywheel 16 and generator 14. The impeller mechanism of FIG. 3 specifically differs from that of FIGS. 1 and 2 in that the chain 22 is replaced by an arcuate gear segment 122. In the alternative embodiment of FIG. 4, the impeller element is a rack gear 222 supported for vertical movement in guide brackets 40, 42 attached to the post 10. The lower end of rack gear 222 is fixedly connected to the float shaft 36 for vertical movement as a result of wave action. The embodiment of FIG. 4 does not need a tide height adjustment mechanism, as the rack gear 222 can readily be made long enough to cope with all expected tide height variations.

In the alternative embodiment of FIG. 5, the impeller element is a rotary gear 322 journalled in a bearing 44 attached to post 10. A drive rod 46 is eccentrically connected to the rotary gear 322 at 48 and to the float shaft 36 at 50. Vertical motion of the float shaft 36 in guide 52 is translated into rotary motion of gear 44 in a manner readily apparent from FIG. 5.

In order to prevent the mechanism from stopping in a position where the pivot point 48 is directly above or below the bearing 44 (in which position rotation of the gear 44 would be difficult to initiate) a weight 54 may be provided on the rotary gear 322 to urge the mechanism into an intermediate position when at rest.

Figure 6:
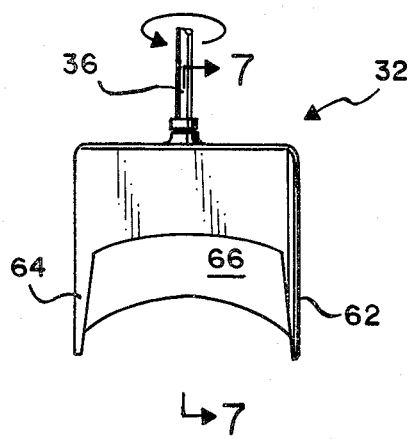
FIG. 6 is an end elevation of a preferred type of float suitable for use with the invention.
Figure 7:
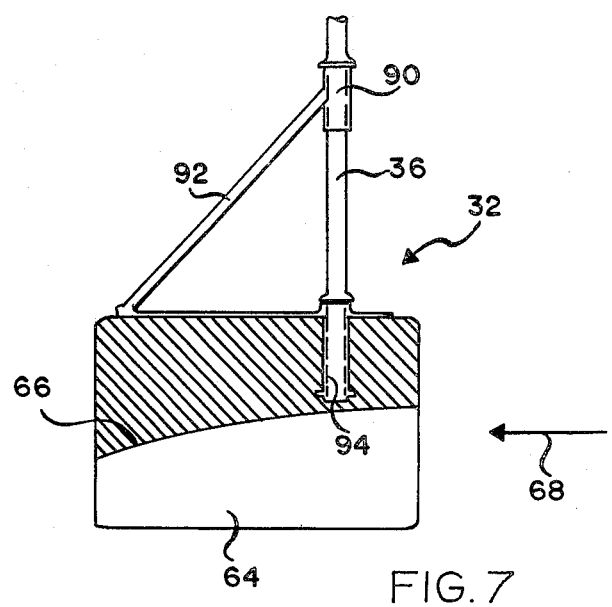
FIG. 7 is a vertical section of the float along line 7—7 of FIG. 6.

FIGS. 6 and 7 depict a preferred embodiment of float 32. In this preferred embodiment, the float 32 (which may be hollow or constructed of a buoyant material) is suspended from float shaft 36 through a swivel mechanism 60 which allows the depending lateral vanes 62, 64 to coact with the curved surface 66 in positioning the float 32 so that any tidal or other currents existing in the body of water 11 (FIG. 1) will cause the water flow to approach the float in the direction of the arrow 68 (FIG. 7). When this is the case, the curvature of the surface 66 produces additional lift for the float 32, as a current of water impinges against it, above and beyond the lift provided by the buoyancy of the float itself.

The float 32 automatically swings into the direction of any current 68 which may exist in the body of water, by way of a swivel arrangement consisting of a journal 90 supporting a pair of diverging arms 92a and 92b and a journal 94 formed in a body of float 32 to pivotally receive the end of float shaft 36. By this arrangement, the float 32 will turn into the direction of any current 68 much in the same way as a weather vane turns into the wind (i.e. by a castering action). The position of the journal 94 and the arms 92 with respect to the body of float 32 is such that the combined wave and tidal action will produce an upward force centered approximately in a direction coaxial with the float shaft 36.

Figure 8:
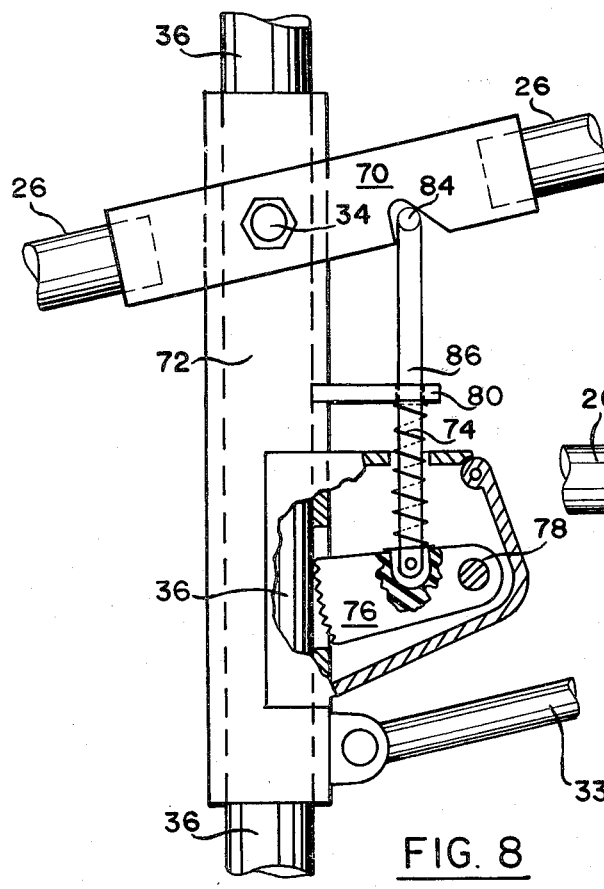
FIG. 8 is a side elevation of a mechanism designed to compensate for tidal height variations.
Figure 9:
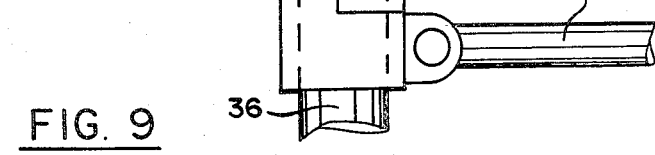
FIG. 9 is a view similar to FIG. 8 but showing the mechanism in a position corresponding to the top of the impeller's stroke during a rising tide.

FIGS. 8 and 9 illustrate an adjustment mechanism which compensates for variations in the mean water level due to tidal action. The lower arm 26 of the device of FIGS. 1 through 3 is interrupted at the pivot point 34 by a notched bracket 70 which is pivotally connected to the sleeve 72 at the pivot point 34. A tension spring 74 tends to pull the toothed plate 76 upwardly about pivot 78 toward the bracket 80 which is mounted on sleeve 72. As long as the toothed plate 76 is in contact with float shaft 36 inside sleeve 72, float shaft 36 is rigidly held with respect to sleeve 72 and operates as previously described in connection with FIGS. 1 through 3.

During a rising tide, the float during its upward stroke tends to push the lower arm higher and higher. Eventually the top of the upstroke of the float will result in the condition shown in FIG. 9. At that point, the notch 82 of the notched bracket 70 engages the horizontal portion 84 of the operating arm 86 and pushes it downward. This causes toothed plate 76 to pivot downwardly about pivot 78 against the tension of spring 74 and to swing clear of float shaft 36 in sleeve 72. A further rising of the float now causes the float shaft 36 to move upwardly within sleeve 72 and thus to shorten the effective length of float shaft 36. As soon as the downstroke of the float begins, the notch 82 disengages the operating arm 86, and the float shaft 36 once again becomes locked to sleeve 72.

With a lower tide, the end of the downstroke of float shaft 36 eventually results in a condition where the float 32 comes out of the water. At this point, the weight on the float shaft 36 is considerably increased and this weight increase is enough to overcome the action of tension spring 74, thereby allowing float shaft 36 to slide downward within sleeve 72 by pulling the toothed plate 76 out of engagement with its wall.

It will be seen that the action of the mechanism of FIGS. 8 and 9 is such as to adjust the effective length of float shaft 36 to where the float 32 can always make a full stroke in response to the wave motion.

An alternative embodiment of the tide height adjustment mechanism for float shaft 36 is shown in FIGS. 10 through 12. Although the mechanism of FIGS. 10 through 12 can be used with any of the apparatus embodiments shown in FIGS. 1 through 5, its use is particularly indicated with the embodiment of FIG. 5 which does not lend itself to the use of the adjustment mechanism of FIGS. 8 and 9.

As shown in FIG. 10, the float 32 is equipped with a sleeve 102 extending preferably between the upper ends of the arms 92 and the body of float 32. The float shaft 36 is slidably received within sleeve 102, and a relatively small control float 104 is attached to the sleeve 102 by means of a bracket 106 carrying pivot bearing 108 in which the arm 110 of control float 104 is journalled. When the mechanism of FIG. 10 is used with the embodiment of FIG. 5, the castering action of float 32 is accomplished through a swivel bearing 112 (FIG. 5) which connects the upper portion 36a and the lower portion 36b of float shaft 36.

The action of the mechanism shown in FIGS. 10 through 12 is as follows:

As the water level rises, the float shaft 36 eventually reaches the top of its stroke at a time when the water level at the crest of the wave is still rising. Inasmuch as the float 32 can now move no higher, the float 32 becomes submerged. As it does so, the water level with respect to the float 32 rises sufficiently to raise the control float 104. This causes arm 110 to pivot in a counter-clockwise direction about pivot journal 108. The toothed convolute end surface 114 (FIG. 12) of dog 116, which in FIG. 12 firmly engages the float shaft 36, now releases the float shaft 36 so as to allow the float 32 to rise with respect to float shaft 36 until the resultant lowering of control float 104 once again locks float shaft 36 to sleeve 102.

As the tide falls, the float 32 eventually tends to rise out of the water in the trough of a wave at the lower end of the stroke of float shaft 36. When this happens, the weight of float 32 (which is considerably greater than the weight of control float 104) overcomes the locking action of the toothed convolute surface 114 and pulls the control float 104 up sufficiently to allow the sleeve 102 to slide downwardly on float shaft 36 until float 32 again floats at its normal level in the water.

I claim:

1. Apparatus for producing electric power from wave motion, comprising:
    (a) support means arranged to be fixedly positioned in a body of water subject to wave motion;
    (b) generator means mounted on said support means;
    (c) flywheel means associated with said generator means to store rotational energy for driving said generator means;
    (d) impeller means movably mounted with respect to said support means for imparting rotational energy to said flywheel means; and
    (e) float means arranged to move said impeller means in response to wave motion in said body of water, said float means being coupled to a swivel arrangement for permitting the float means to turn into the direction of a wave current by a castering action;
    (f) said float body adapted to be partially submerged; generally parallel fin means depending from said float body;
    said float body having on its underside an inclined surface whose upper end is generally adjacent one end of said fin means and whose lower end is generally adjacent the other end of said fin means;
    means arranged to support said float for pivotal movement about a generally vertical axis.

2. Apparatus for producing electric power from wave motion, comprising:
    (a) support means arranged to be fixedly positioned in a body of water subject to wave motion;
    (b) generator means mounted on said support means;

(c) flywheel means associated with said generator means to store rotational energy for driving said generator means;

(d) impeller means movably mounted with respect to said support means for imparting rotational energy to said flywheel means; said impeller means comprising:

(i) a pair of arms disposed at a fixed angle to each other and journalled for pivotal movement about their apex;

(ii) a counterweight coupled to said apex to balance said pair of arms;

(iii) chain means extending between said arms remote from said apex; and (iv) sprocket means associated with said generating means and arranged to be engaged by said chain means for rotation thereby upon pivotal movement of said arms; and (e) float means arranged to move said impeller means in response to wave motion in said body of water.

3. Apparatus for producing electric power from wave motion, comprising:

(a) support means arranged to be fixedly positioned in a body of water subject to wave motion;

(b) generator means mounted on said support means;

(c) flywheel means associated with said generator means to store rotational energy for driving said generator means;

(d) impeller means movably mounted with respect to said support means for imparting rotational energy to said flywheel means; said impeller means having a vertically limited range of movement;

(e) float means arranged to move said impeller means in response to wave motion in said body of water; and (f) means arranged to compensate for tide height variations, said means comprising:

(i) float shaft means associated with said float means;

(ii) sleeve means surrounding said float shaft means, said sleeve means being coupled to said impeller means;

(iii) motion impeding means associated with said sleeve means and normally biased into an engagement with said float shaft means such as to prevent longitudinal sliding movement of said float shaft means with respect to said sleeve means; and (iv) releasing means arranged to release said engagement when said impeller means reach the upper limit of their movement;

(v) said motion impeding means being so arranged as to become disengaged by the weight of said float means when said float means are lifted out of said body of water by said float shaft means.

4. The apparatus of claims 2 or 3, said float means comprising:

(a) a buoyant float body adapted to be partially submerged;

(b) generally parallel fin means depending from said float body;

(c) said float body having on its underside an inclined surface whose upper end is generally adjacent one end of said fin means and whose lower end is generally adjacent the other end of said fin means; and (d) means arranged to support said float for pivotal movement about a generally vertical axis.

5. The apparatus of claim 4, said generally vertical axis being substantially offset from the center of said float so as to provide said float with a castering action.

6. The apparatus of claim 2 or 3, further comprising one-way clutch means interposed between said impeller means and said generator means.

7. The apparatus of claim 1 or 3, in which said impeller means include:

(i) a pair of arms disposed at a fixed angle to each other and journalled for pivotal movement about their apex;

(ii) chain means extending between said arms remote from said apex; and (iii) sprocket means associated with said generating means and arranged to be engaged by said chain means for rotation thereby upon pivotal movement of said arms.

8. The apparatus of claim 3 or 2, further comprising spring means interposed between one of said arms and one end of said chain means, said spring means being arranged to bias said chain means into firm engagement with said sprocket means.

9. The apparatus of claim 1 or 3, in which said impeller means include:

(i) a pair of arms disposed at a fixed angle to each other and journalled for pivotal movement about their apex;

(ii) arcuate gear means extending between said arms remote from said apex; and (iii) pinion gear means associated with said generating means and arranged to be engaged by said arcuate gear means for rotation thereby upon pivotal movement of said arms.

10. The apparatus of claim 1 or 3, in which said impeller means include:

(i) rack gear means mounted for generally vertically sliding movement with respect to said support means; and (ii) pinion gear means associated with said generating means and arranged to be engaged by said rack gear means for rotation thereby upon movement of said rack gear means.

11. The apparatus of claim 1 or 3, in which said impeller means include:

(i) rotary gear means fixedly mounted with respect to said support means;

(ii) linkage means eccentrically connected to said rotary gear means and connected to said float means for rotating said rotary gear means upon vertical movement of said float means; and (iii) pinion gear means associated with said generating means and arranged to be engaged by said rotary gear means for rotation thereby.

12. The apparatus of claim 11, further comprising weight means disposed upon said rotary gear means at a location such as to urge said rotary gear means into a position in which the point of connection of said linkage means to said rotary gear means is substantially horizontally displaced from the axis of said rotary gear means.

13. The apparatus of claim 1 or 2, further comprising pantograph means connected between float means and a point fixed with respect to said support means, said pantograph means being arranged to confine said float means to generally vertical movement.

14. The device of claim 1 or 2, in which said impeller means have a vertically limited range of movement, further comprising means arranged to compensate for tide height variations, said means including;

(i) float shaft means associated with said float means;
(ii) sleeve means surrounding said float shaft means;
(iii) motion impeding means associated with said sleeve means and normally biased into an engagement with said float shaft means such as to prevent longitudinal sliding movement of said float shaft means with respect to said sleeve means; and
(iv) releasing means arranged to release said engagement when said impeller means reach the upper limit of their movement;
(v) said motion impeding means being so arranged as to become disengaged by the weight of said float means when said float means are lifted out of said body of water by said float shaft means.

15. The device of claim 12 or 3, in which said float shaft means are vertically fixed with respect to said float means, said float shaft means are constrained to maintain a constant angle with respect to said support means, and said release means are operationally responsive to relative angular position of said float shaft means with respect to said impeller means.

16. The device of claim 12 or 3, in which said float shaft means are vertically movable with respect to said float means, and which further comprises control float said control means being arranged to operate said release means upon excessive immersion of said float means.

* * * * *